Patented Aug. 30, 1932

1,874,107

UNITED STATES PATENT OFFICE

WALTER E. LAWSON AND JAMES H. WERNTZ, OF WILMINGTON, DELAWARE, ASSIGNORS TO E. I. DU PONT DE NEMOURS & COMPANY, OF WILMINGTON, DELAWARE, A CORPORATION OF DELAWARE

VINYL DERIVATIVE AND PROCESSES OF PREPARING IT

No Drawing. Application filed January 20, 1930. Serial No. 422,215.

This invention relates to the art of polymerization, and more particularly to a new polymer of vinyl chloride and a process of preparing it.

Various methods have hitherto been developed for the polymerization of vinyl derivatives and these methods resulted in the production of four different polymers of vinyl chloride,—the alpha polymer, which is soluble in acetone; the beta polymer, which is insoluble in acetone but soluble in monochlorobenzene; and the delta and gamma polymers, which are higher polymers substantially insoluble in ordinary solvents. These polymers are all insoluble in aromatic hydrocarbons, thus making it necessary to use expensive solvents when utilizing these polymers in the preparation of coating compositions and other commercial products.

We have discovered a new polymer of vinyl chloride, which is soluble in most aromatic hydrocarbons and in toluene in particular.

It is therefore an object of this invention to provide a new and useful vinyl chloride polymer.

It is another object of this invention to provide a toluene soluble polymer of vinyl chloride.

It is a further object of this invention to prepare a vinyl chloride polymer having lower viscosity characteristics than previously known polymers of vinyl chloride.

It is a still further object of this invention to provide a process of making a toluene soluble polymer of vinyl chloride.

With the above and other objects in view, which will be apparent as the description proceeds, we have set forth our invention in the following specification and have included the following examples by way of illustration and not as a limitation.

In the following examples a solution of vinyl chloride containing the desired amount of catalyst is forced from a storage cylinder through a reaction tube by means of a gas, such as nitrogen, under pressure or by any other suitable means, such as a force pump. The products leaving the reaction tube pass through a cooling coil and are drawn off through a carefully regulated needle valve, the rate of flow through the reaction tube being regulated by the rate of draw-off through this valve.

Example 1

A mixture of 1500 parts by weight of vinyl chloride, 1000 parts by weight of toluene, and 45 parts by weight of benzoyl peroxide was passed through a lead-lined tube 3 feet in length, and having a volume of 463 cc., at a rate of 300 cc. per hour, at 115° to 120° C. under a pressure of 500 lbs. per square inch, furnished by nitrogen gas. 1770 parts by weight of light brown solution was obtained. This had an acid number of 6.0, a viscosity less than 0.5 poise at 20° C. and contained 42.6% solids, which was equivalent to a yield of 50.3% of toluene soluble polymer of vinyl chloride.

Example 2

A mixture of 2400 parts by weight of vinyl chloride, 1600 parts by weight of Hi-flash naphtha, and 96 parts by weight of benzoyl peroxide was passed through a lead-lined tube 3 feet in length, and having a volume of 463 cc., at a rate of 300 cc. per hour, at a temperature of 110° to 115° C. under a pressure of 500 lbs. per square inch, furnished by nitrogen gas. This gave 3315 parts by weight of a white solution which had an acid number of 3.8, a viscosity less than 0.5 poise at 20° C. and contained 27.9% solids, which corresponded to a yield of 38.3% of toluene soluble polymer of vinyl chloride.

Example 3

A solution containing 1500 parts by weight of vinyl chloride, 1000 parts by weight of solvent naphtha, and 60 parts by weight of benzoyl peroxide was passed through a lead-lined tube 1½ feet in length, and having a volume of 110 cc., at a rate of 300 cc. per hour, at a temperature of 115° to 120° C. and under a pressure of 500 lbs. per square inch, furnished by nitrogen gas. This resulted in 1800 parts by weight of a light brown solution which had an acid number of 5.0, and a viscosity of 2.5 poises at 19° C. This contained 42.0% solids, thus giving a yield of 51% of toluene soluble polymer of vinyl chloride.

*Example 4*

A mixture of 400 parts by weight of vinyl chloride, 264 parts by weight of ethyl acetate, and 17 parts by weight of benzoyl peroxide was passed through a lead-lined tube 1½ feet in length, and having a volume of 110 cc., at 125° C. under a pressure of 600 lbs. per square inch, furnished by nitrogen gas. The reaction product was 498 parts by weight of an orange colored solution which had a viscosity of less than 0.5 poise at 20° C., and contained 34% solids, which corresponded to a yield of 42.0% of toluene soluble polymer of vinyl chloride.

*Example 5*

A mixture of 1500 parts by weight of vinyl chloride and 1000 parts by weight of toluene was treated with ozone for a short time (e. g., 1 hour) and then passed through a lead-lined tube 3 feet in length, and having a volume of 463 cc., at a rate of 300 cc. per hour, at 115° to 120° C. under a pressure of 500 lbs. per square inch furnished by nitrogen gas. This gave 1330 parts by weight of a white solution which had an acid number of 1.0, and a viscosity of less than 0.1 poise at 21° C., and contained 13.3% solids, corresponding to a yield of 11.5% toluene soluble polymer of vinyl chloride.

*Example 6*

A solution containing 875 parts by weight of vinyl chloride, 575 parts by weight of ethylene dichloride, and 24 parts by weight of benzoyl peroxide was passed through a lead-lined tube 3 feet in length, having a volume of 463 cc., at a rate of 400 cc. per hour, at 110° to 120° C. under a pressure of 500 lbs. per square inch, furnished by nitrogen gas. There was obtained 930 parts by weight of a brown solution which had a viscosity of less than 0.3 poise at 20° C. This contained 26.2% solids, corresponding to a yield of 27.8% of a polymer of vinyl chloride which was soluble in aromatic hydrocarbons.

*Example 7*

A mixture of 1500 parts by weight of vinyl chloride, 1000 parts by weight of acetone, and 45 parts by weight of benzoyl peroxide was passed through a lead-lined tube 3 feet in length, and having a volume of 463 cc., at a rate of 300 cc. per hour, at 120° C. under a pressure of 500 lbs. per square inch, furnished by nitrogen gas. This yielded 1748 parts by weight of a light brown solution which had an acid number of 4.7, and a viscosity of 0.5 poise at 25° C. This contained 45.9% solids, corresponding to a yield of 53.5% of toluene soluble polymer of vinyl chloride.

*Example 8*

A mixture of 2400 parts by weight of vinyl chloride, 1600 parts by weight of toluene, and 72 parts by weight of benzoyl peroxide was passed through a porcelain-lined tube 8 feet in length, and having a volume of approximately 800 cc. at a rate of 1000 cc. per hour, at 105° to 110° C. under a pressure of 540 lbs. per square inch, furnished by nitrogen gas. This yielded 2951 parts by weight of a grey colored solution which had an acid number of 4.7, and a viscosity of 0.8 poise at 21° C. This contained 39.9% solids, corresponding to a yield of 49.1% of toluene soluble polymer of vinyl chloride.

Although the above examples are limited to the use of toluene, Hi-flash naphtha and solvent naphtha as examples of aromatic hydrocarbons, to ethyl acetate as an example of an ester, to ethylene dichloride as an example of a halogenated hydrocarbon, and to acetone as an example of a ketone, other solvents of these general types, such as xylene, benzene and monochlorobenzene, may be used.

Furthermore, although we have not found alcohols and aliphatic hydrocarbons satisfactory solvents by themselves, we have secured low yields of the toluene soluble polymer of vinyl chloride by using mixtures of aliphatic hydrocarbons with aromatic hydrocarbons, or mixtures of alcohols with aromatic hydrocarbons (for example, using equal parts of mineral spirits having a boiling point of from 143° to 203° C. and Hi-flash naphtha, or using equal parts of butyl alcohol and toluene.) We prefer not to use mixtures of this type, however, because the polymer precipitates out after standing a few minutes and this causes a clogging of the tubes, with a resultant delay for cleaning, especially if the concentration of vinyl chloride is increased. Furthermore, the use of alcohol solvents leads to the formation of considerable quantities of the alpha polymer.

Although benzoyl peroxide and ozone are used as the catalysts in the above examples, other catalysts, such as other peroxides. including toluyl peroxide, palmityl peroxide, acetyl peroxide, hydrogen peroxide and barium peroxide, or an ozonide, can be used.

Likewise, although the above examples are limited to a temperature range of from 110° to 125° C., our process may be carried out at temperatures of from 90° to 150° C. We prefer to use a range of 110° to 130° C., however, since polymerization takes place rather slowly at temperatures below 110° C. and the polymer darkens at temperatures higher than 130° C.

Although the rate at which the reaction mixture is passed through the tubes may be varied considerably, we prefer to operate under such conditions that the volume of liquid passing through the tubes per hour has a volume of from one-half to three times the volume of the reaction tube.

A pressure of at least 200 lbs. per square inch is desirable in order to keep the vinyl chloride in the liquid state, and we prefer to use a pressure of about 500 lbs. per square inch, particularly with our preferred concentration, which is a 50 to 70% solution of vinyl chloride in the solvent used.

Although lead-lined and porcelain reaction tubes are disclosed in the examples, the lining may be of other suitable material.

The new polymer of vinyl chloride prepared by the process set forth herein not only differs from the previously known polymers of vinyl chloride in being soluble in aromatic hydrocarbons, whereas none of the previously known polymers have been found to be even 5% soluble in such solvents, but it is also soluble in acetone, chlorobenzene and the other solvents which dissolve the alpha polymer.

The new polymer also has a far lower viscosity in solution than the other polymers as evidenced by the fact that the alpha polymer, which is the most soluble one previously described in the literature, forms a gel at room temperature in a 30% concentration in ethyl acetate (one of its best solvents), whereas the new polymer has a viscosity of less than 0.5 poise under similar circumstances. While we do not wish to be limited in this regard, the difference in viscosity characteristics suggests that the new polymer is a lower polymer than the alpha form, but attempts to convert it into the latter form, by subjecting its solutions to ultra-violet light or protracted heating in sealed tubes at 100° to 110° C., were unsuccessful.

The new polymer is not readily compatible with drying oils, as shown by the deposition of cloudy films from solutions containing equal weights of drying oil and polymer, whereas the alpha polymer is compatible with a considerable number of such oils. Films of the new polymer are slower drying, but they are tougher and less brittle than films prepared from the alpha polymer.

The new polymer has therefore been found to be a useful ingredient in coating compositions, such as varnishes, enamels and lacquers, and in plastic compositions. Protective finishes prepared from it are unusually resistant to moisture, brine and acids, rendering them particularly suitable for coating objects which come in contact with corrosive materials.

The new polymer is consequently not only more desirable as a constituent of coating compositions than the previously known polymers, but it permits the use of cheaper solvents, gives heavier films by reason of the higher concentrations which may be employed at spraying viscosities, requires a smaller proportion of softener, and its films retain their flexibility for much longer periods than do those of previously known polymers. Furthermore, the new polymer can be prepared more readily than the other polymers for it is prepared by a continuous process and is not dependent upon sunlight as a source of energy for the polymerization.

It will therefore be apparent that we have developed a new and useful polymer of vinyl chloride and a new and useful process of preparing it, and that the resulting polymer is a synthetic resin which is useful in a wide range of commercial applications.

As many apparently widely different embodiments of this invention may be made without departing from the spirit and scope thereof, it is to be understood that we do not limit ourselves to the specific embodiments thereof except as defined in the appended patent claims.

We claim:

1. A light, colored toluene soluble polymer of vinyl chloride.

2. A synthetic resin which comprises a light colored toluene soluble polymer of vinyl chloride.

3. A polymer of vinyl chloride which has a viscosity of less than 0.5 poise in a 30% solution in ethyl acetate at room temperature.

4. The process of making a toluene soluble polymer of vinyl chloride, which comprises passing a mixture containing 1500 parts by weight of vinyl chloride, 1000 parts by weight of toluene, and 45 parts by weight of benzoyl peroxide through a reaction tube having a capacity of from 450 to 500 parts by weight of the reaction mixture at a rate of 200 to 600 parts per hour at a temperature of 115° to 120° C. and under a pressure of 500 lbs. per square inch.

5. The process of securing a yield of toluene soluble polymer of vinyl chloride in excess of a 25% conversion, which comprises passing a mixture of vinyl chloride, toluene and benzoyl peroxide through a reaction tube at a temperature of 110° to 120° C., and under a pressure of about 500 lbs. per square inch.

6. The method of making a toluene-soluble polymer of vinyl chloride which comprises polymerizing a vinyl chloride solution by passing the solution through a polymerizing tube heated to a temperature between 90° and 150° C. at a rate such that the volume of solution passed through the tube in one hour is from one-half to three times the volume of the tube at a pressure above atmospheric and with continuous withdrawl of the polymer.

7. The method of making a toluene-soluble polymer of vinyl chloride comprising polymerizing a vinyl chloride solution containing a polymerization catalyst and solvents other than alcohols and aliphatic hydrocarbons by passing the solution through a polymerizing tube heated to a temperature between 110° and 130° C. at a rate such that the volume of solution passed through the tube in one hour is from one-half to three times the volume of the tube at a pressure sufficient to keep the vinyl chloride in a liquid state and with continuous withdrawal of the polymer.

8. The method of making a toluene-soluble polymer of vinyl chloride comprising polymerizing a vinyl chloride solution containing an oxygen-containing polymerization catalyst and a solvent containing toluene by passing the solution through a polymerizing tube heated to a temperature between 110° and 130° C. at a rate such that the volume of solution passed through the tube in one hour is from one-half to three times the volume of the tube at a pressure greater than 200 lbs. per sq. in. and with continuous withdrawal of the polymer.

9. The method set forth in claim 8 in which the pressure is about 500 lbs. per sq. in.

In testimony where we affix our signatures.

WALTER E. LAWSON.
JAMES H. WERNTZ.

CERTIFICATE OF CORRECTION.

Patent No. 1,874,107.     August 30, 1932.

WALTER E. LAWSON ET AL.

It is hereby certified that error appears in the printed specification of the above numbered patent requiring correction as follows: Page 3, line 95, claim 1, after the word "light" strike out the comma; and that the said Letters Patent should be read with this correction therein that the same may conform to the record of the case in the Patent Office.

Signed and sealed this 29th day of November, A. D. 1932.

(Seal)     M. J. Moore,
Acting Commissioner of Patents.

pheric and with continuous withdrawl of the polymer.

7. The method of making a toluene-soluble polymer of vinyl chloride comprising polymerizing a vinyl chloride solution containing a polymerization catalyst and solvents other than alcohols and aliphatic hydrocarbons by passing the solution through a polymerizing tube heated to a temperature between 110° and 130° C. at a rate such that the volume of solution passed through the tube in one hour is from one-half to three times the volume of the tube at a pressure sufficient to keep the vinyl chloride in a liquid state and with continuous withdrawal of the polymer.

8. The method of making a toluene-soluble polymer of vinyl chloride comprising polymerizing a vinyl chloride solution containing an oxygen-containing polymerization catalyst and a solvent containing toluene by passing the solution through a polymerizing tube heated to a temperature between 110° and 130° C. at a rate such that the volume of solution passed through the tube in one hour is from one-half to three times the volume of the tube at a pressure greater than 200 lbs. per sq. in. and with continuous withdrawal of the polymer.

9. The method set forth in claim 8 in which the pressure is about 500 lbs. per sq. in.

In testimony where we affix our signatures.
WALTER E. LAWSON.
JAMES H. WERNTZ.

CERTIFICATE OF CORRECTION.

Patent No. 1,874,107.                                    August 30, 1932.

WALTER E. LAWSON ET AL.

It is hereby certified that error appears in the printed specification of the above numbered patent requiring correction as follows: Page 3, line 95, claim 1, after the word "light" strike out the comma; and that the said Letters Patent should be read with this correction therein that the same may conform to the record of the case in the Patent Office.

Signed and sealed this 29th day of November, A. D. 1932.

(Seal)

M. J. Moore,
Acting Commissioner of Patents.

CERTIFICATE OF CORRECTION.

Patent No. 1,874,107. August 30, 1932.

WALTER E. LAWSON ET AL.

It is hereby certified that error appears in the printed specification of the above numbered patent requiring correction as follows: Page 3, line 95, claim 1, after the word "light" strike out the comma; and that the said Letters Patent should be read with this correction therein that the same may conform to the record of the case in the Patent Office.

Signed and sealed this 29th day of November, A. D. 1932.

(Seal)

M. J. Moore,
Acting Commissioner of Patents.